US008660321B2

(12) United States Patent
Hosoi

(10) Patent No.: US 8,660,321 B2
(45) Date of Patent: Feb. 25, 2014

(54) AUTHENTICATION SYSTEM, APPARATUS, AUTHENTICATION METHOD, AND STORAGE MEDIUM WITH PROGRAM STORED THEREIN

(75) Inventor: Toshinori Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 251 days.

(21) Appl. No.: 13/129,523

(22) PCT Filed: Oct. 5, 2009

(86) PCT No.: PCT/JP2009/005164
§ 371 (c)(1),
(2), (4) Date: May 16, 2011

(87) PCT Pub. No.: WO2010/058514
PCT Pub. Date: May 27, 2010

(65) Prior Publication Data
US 2011/0216947 A1    Sep. 8, 2011

(30) Foreign Application Priority Data
Nov. 19, 2008    (JP) ................................. 2008-295957

(51) Int. Cl.
*G06K 9/00* (2006.01)
*G06F 21/00* (2013.01)
*G06F 7/04* (2006.01)

(52) U.S. Cl.
USPC ........... 382/118; 382/115; 713/182; 713/186; 726/2

(58) Field of Classification Search
USPC .......... 382/118, 115, 190; 713/172, 182–186, 713/166; 726/17, 21, 1–5, 9; 707/104.1
See application file for complete search history.

(56) References Cited

U.S. PATENT DOCUMENTS

| 7,532,745 | B2 | 5/2009 | Inoue | |
| 7,665,122 | B2* | 2/2010 | Torii | ................................. 726/2 |
| 8,312,291 | B2* | 11/2012 | Golic et al. | ................... 713/186 |
| 2007/0179978 | A1* | 8/2007 | Lee et al. | ................... 707/104.1 |
| 2008/0112645 | A1 | 5/2008 | Asano | |

FOREIGN PATENT DOCUMENTS

| JP | 5-20442 A | 1/1993 |
| JP | 10-240941 A | 9/1998 |
| JP | 2003-141542 A | 5/2003 |
| JP | 2003-233816 A | 8/2003 |
| JP | 2003-323622 A | 11/2003 |
| JP | 2007-26330 A | 2/2007 |
| JP | 2007-148872 A | 6/2007 |
| JP | 2008-123206 A | 5/2008 |
| WO | WO 02/25457 A1 | 3/2002 |
| WO | WO 2007/053458 A1 | 5/2007 |

* cited by examiner

Primary Examiner — Sheela Chawan
(74) *Attorney, Agent, or Firm* — Foley & Lardner LLP

(57) ABSTRACT

Unauthorized use of a biological pattern registered in a face image authorization system is made difficult. With respect to the previously registered biological pattern for authorization, additional information is held concerning a change that can be reproduced by a user having the biological pattern for authentication, and success or failure of the authentication is evaluated according to consistency between the biological pattern for authentication that is reproduced using the additional information and a pattern input at the time of authentication as an evaluation factor. By changing the additional information as necessary, unauthorized use of biological pattern data or the like is made difficult.

17 Claims, 8 Drawing Sheets

AUTHENTICATION SYSTEM, APPARATUS, AUTHENTICATION METHOD, AND STORAGE MEDIUM WITH PROGRAM STORED THEREIN

This application is the National Phase of PCT/JP2009/005164, filed Oct. 5, 2009, which claims priority to Japanese Application No. 2008-295957, filed Nov. 19, 2008, the disclosures of which are hereby incorporated by reference in their entirety.

TECHNICAL FIELD

The present invention relates to an authentication system, an apparatus, an authentication method, and a storage medium with a program stored therein, and particularly to an authentication system, an apparatus, an authentication method, and a storage medium with a program stored therein that evaluate success or failure of authentication by comparing an input image and an image for authentication which is registered in advance.

BACKGROUND ART

An example of technique concerning a personal authentication system using a face image is disclosed in PTL 1. PTL 1 matches the face image of a person and performs matching using an eigenvector of a Fourier spectrum pattern which is made by performing Fourier analysis on an entire image. Then, it is possible to evaluate whether an input image is a specific person or not, and thus the input image can be used for personal authentication.

In PTL 1, by registering a face image of each person or feature extracted from the face image in advance, and comparing and matching the input face image and the registered face image or the feature extracted from the face image, it is possible to evaluate whether the input face image is the registered person or not, thereby enabling authentication of the person.

As other related arts, an example of an image recognition system that can perform correct categorization even when there is a concealment in the input image is described in PTL 2. PTL 2 obtains a matching result of a whole image after performing a matching process to each partial image of the input image, and especially since a matching score can be output that has a tendency of removing influence of the part including the concealment in an object to be matched, it can be also said as a matching technique using the part excluding the concealed part. It is needless to say that this technique can also be used for personal authentication applications by a face image.

Since the face image authentication system as above can generally use a non-contact sensor like a video camera as an input apparatus of an image, there is an advantage that it is not necessary for a person to be authenticated to contact the sensor.

On the other hand, generally the biometric authentication system including a face authentication system cannot completely zero an error rate in any authentication method. Therefore, in order to increase the accuracy of the authentication system, not only the biometric authentication but non-biometric authentication such as a password and an IC card may be combined and used. For example, PTL 3 discloses a hybrid personal authentication apparatus that combines face authentication, voice verification, a password, and an IC card.

Further, PTL 4 discloses a registration apparatus and a matching apparatus that include, in order to prevent leak of a pattern to be identified, a conceal processing unit that conceals all or a part of an object to be identified, a display control unit that displays an image in which all or a part of the object to be identified is concealed, so that a whole captured image will not be displayed on a screen.

CITATION LIST

Patent Literature

PTL 1: Japanese Unexamined Patent Application Publication No. 5-020442
PTL 2: Japanese Unexamined Patent Application Publication No. 2003-323622
PTL 3: International Patent Publication No. WO 2002/025457
PTL 4: Japanese Unexamined Patent Application Publication No. 2008-123206

SUMMARY OF INVENTION

Technical Problem

First, terms in this specification are defined. In this specification, what is called an "authentication system" indicates a system that registers person's information beforehand, and at the time of authentication, matches person's information being input with the previously registered person's information, and outputs an authentication result.

Further in this specification, a term "registered pattern" is used as a meaning of registration data (an image for authentication or feature converted or extracted from the image for authentication) at the time of registering a person in the authentication system. Further, a term "matching pattern" is used as a meaning of data for matching with the registered pattern that is input as an object to be authenticated. Therefore, a word pattern is used also as feature data that is generated by converting an image in a particular format, not only being used as a meaning of simply an image.

A problem of each authentication system disclosed in the abovementioned PTL 1 and 2 is a point that the pattern (for example, inherent biological patterns such as a "face", a "fingerprint", and an "iris") registered in a system cannot essentially be changed. The reason for that is that as the face is a kind of the biological pattern and it is an unique pattern inherent to a person although there is an aging change, it is extremely difficult to artificially change.

Therefore, when the data corresponding to the registered pattern is forged by others even once, a risk of false authentication by the forged data is permanently maintained. This is a big difference between a password and personal information recorded on an IC card, and the biological pattern.

Such problem cannot be solved at all in the hybrid authentication method like in PTL 3. Similarly, although PTL 4 can reduce generation of the situation of being forged by others, in the case of leak, it is not possible to eliminate the possibility of unauthorized use by the leaked data.

The present invention is made based on the abovementioned consideration, and provides an authentication system that can make unauthorized use of the registered biological pattern difficult.

Solution to Problem

According to a first exemplary aspect of the present invention, an authentication apparatus and a program for causing a computer that composes the authorization apparatus are provided, in which with respect to a previously registered biological pattern for authentication, the authentication apparatus holds additional information concerning a change that can be reproduced by a user having the biological pattern for authentication, and evaluates success or failure of authentication according to consistency between the biological pattern for authentication reproduced using the additional information and a pattern input at authentication time as an evaluation factor.

According to a second aspect of the present invention, a registration apparatus and a program for causing a computer that composes the registration apparatus are provided, in which the registration apparatus includes an input unit that inputs the biological pattern for authentication and a reception unit that, with respect to the biological pattern for authentication, receives information concerning the change that can be reproduced by the user, and provides the biological pattern for authentication at the registration time and the information concerning a concealed part to the abovementioned authentication apparatus.

according to a third exemplary aspect of the present invention, an authentication system is provided that includes the abovementioned authentication apparatus and the abovementioned registration apparatus.

According to a fourth exemplary aspect of the present invention, an authentication method is provided that, with respect to a previously registered biological pattern for authentication, holds additional information concerning a change that can be reproduced by a user having the biological pattern for authentication, and evaluating success or failure of authentication according to consistency between the biological pattern for authentication reproduced using the additional information and a pattern input at authentication time as an evaluation factor.

Advantageous Effects of Invention

According to the present invention, it is possible to change the biological pattern registered in the authentication system and reduce the possibility of illegal authentication. The reason for that is that it is configured in a way that success or failure of the authentication is evaluated according to consistency between the change to be added to the biological pattern for authentication legally registered and the pattern input at the time of authentication as an evaluation factor. For example, by changing the concealed part in the biological pattern for authentication, it is possible to at least prevent from being authenticated only by using leaked data as it is.

DESCRIPTION OF EMBODIMENTS

First, an overview of the present invention is explained. The authentication system according to the present invention receives from a user a setting of a concealed part (see a (concealed part of) a registered pattern of FIG. 1) in a biological pattern for authentication previously registered (see the (entire) registered pattern of FIG. 1), and holds it to a storage apparatus as additional information. At the time of authentication, besides comparison of the entire biological pattern for authentication, the abovementioned authentication system evaluates success or failure of the authentication according to consistency between the concealed part of the biological pattern for authentication and the part corresponding to the concealed part of the pattern input at the time of authentication as an evaluation factor.

Figure 1:
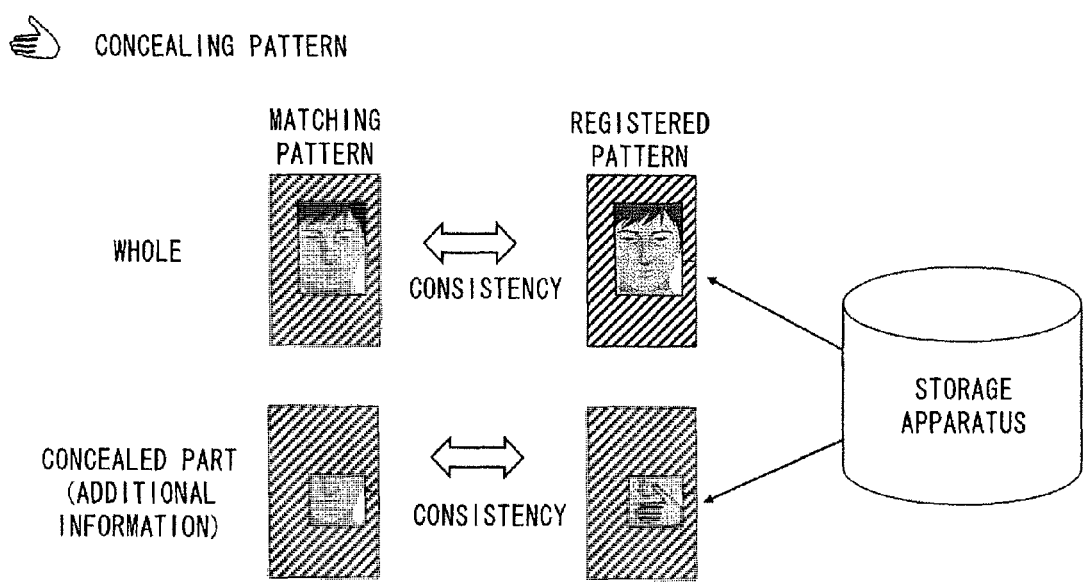
FIG. 1 is a view for explaining an overview of the present invention.

According to the authentication system of the above present invention, for example as shown in the upper row of FIG. 1, even when the consistency is evaluated to be high in the consistency with the entire registered pattern, as shown in the lower row of FIG. 1, it is possible to detect the possibility of being a matching pattern forged or the like at a higher probability since the consistency between the concealed part of the registered pattern and the part corresponding to the concealing pattern in the matching pattern is used as the evaluation factor.

Moreover, according to the authentication system of the present invention, even in the case of leaking the registered pattern itself shown on the right side of FIG. 1, by changing the concealed part (additional information), it is possible to make it extremely difficult to use forged data.

First Exemplary Embodiment

Next, a first exemplary embodiment in which the present invention is applied to a personal authentication system that performs authentication by a face image is described in detail with reference to the drawings.

Hereinafter, in this exemplary embodiment, data in which an arbitrary concealment is intentionally generated in a face is registered as the registered pattern, and when authenticating a person, only in the case of being the same concealed condition as the registered pattern, it is considered to be successful authentication. As the registered pattern, two kinds, which are a pattern with a concealment in a face and a pattern with no concealment, are registered.

Figure 2:
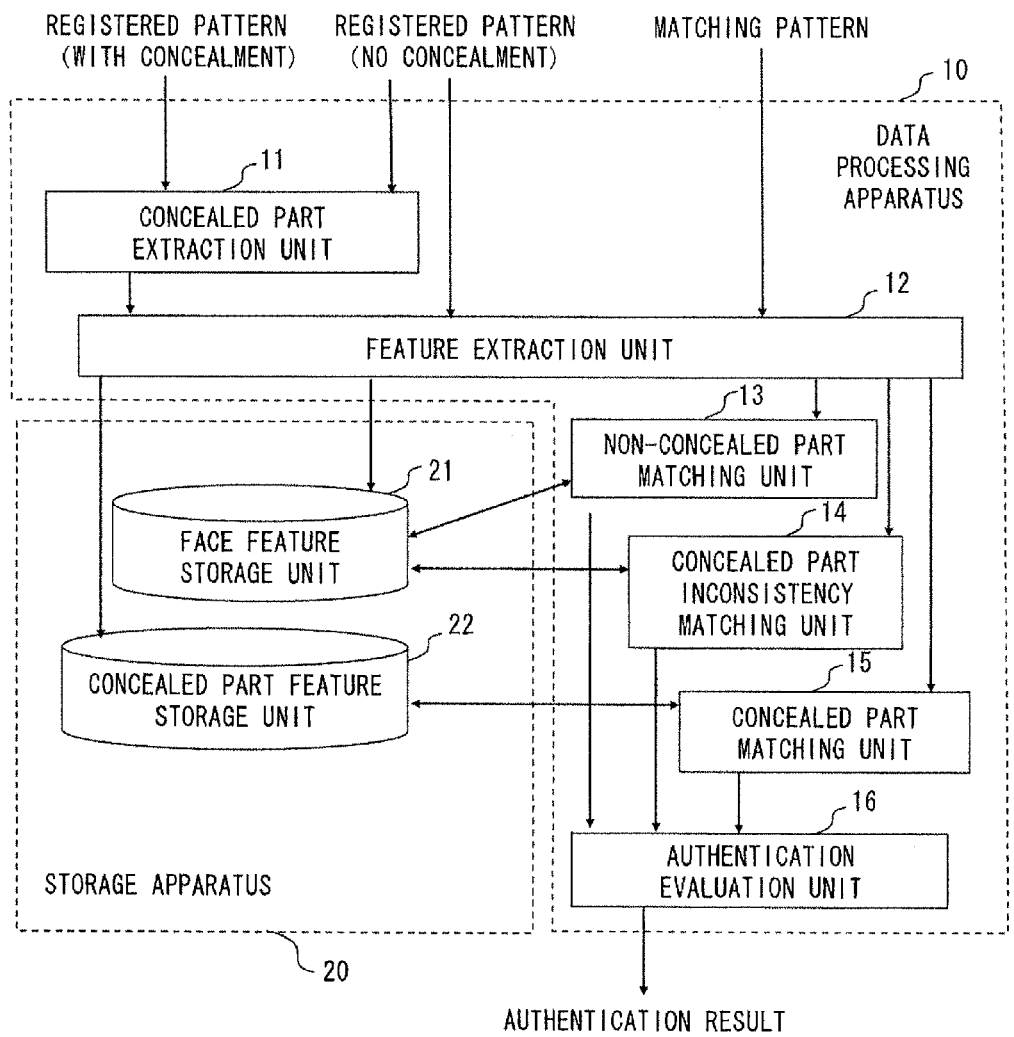
FIG. 2 is a block diagram showing a configuration of a personal authentication system according to a first exemplary embodiment of the present invention.

FIG. 2 is a block diagram showing a configuration of the personal authentication system of the first exemplary embodiment of the present invention. An object recognition system of this exemplary embodiment is composed of a data processing apparatus (central processing unit; processor; computer) 10 that operates by program control and a storage apparatus 20, as shown in FIG. 2.

The data processing apparatus 10 includes a concealed part extraction unit 11 that extracts a part in which the face is concealed in the input registered pattern, a feature extraction unit 12 that extracts feature used in order to match the patterns, a non-concealed part matching unit 13 that evaluates consistency of a non-concealed part in the registered pattern, a concealed part inconsistency matching unit 14 that evaluates inconsistency between a non-concealing pattern and the matching pattern for the concealed part in the registered pattern, a concealed part matching unit 15 that evaluates consistency of the concealed part in the registered pattern, and an authentication evaluation unit 16, and functions as an authentication apparatus.

The storage apparatus 20 includes a face feature storage unit 21 that holds feature of a face pattern extracted by the feature extraction means 12, and a concealed part feature storage unit 22 that holds the feature of the concealed part.

Each of the abovementioned processing units of the data processing apparatus 10 operate as described below.

Figure 5:
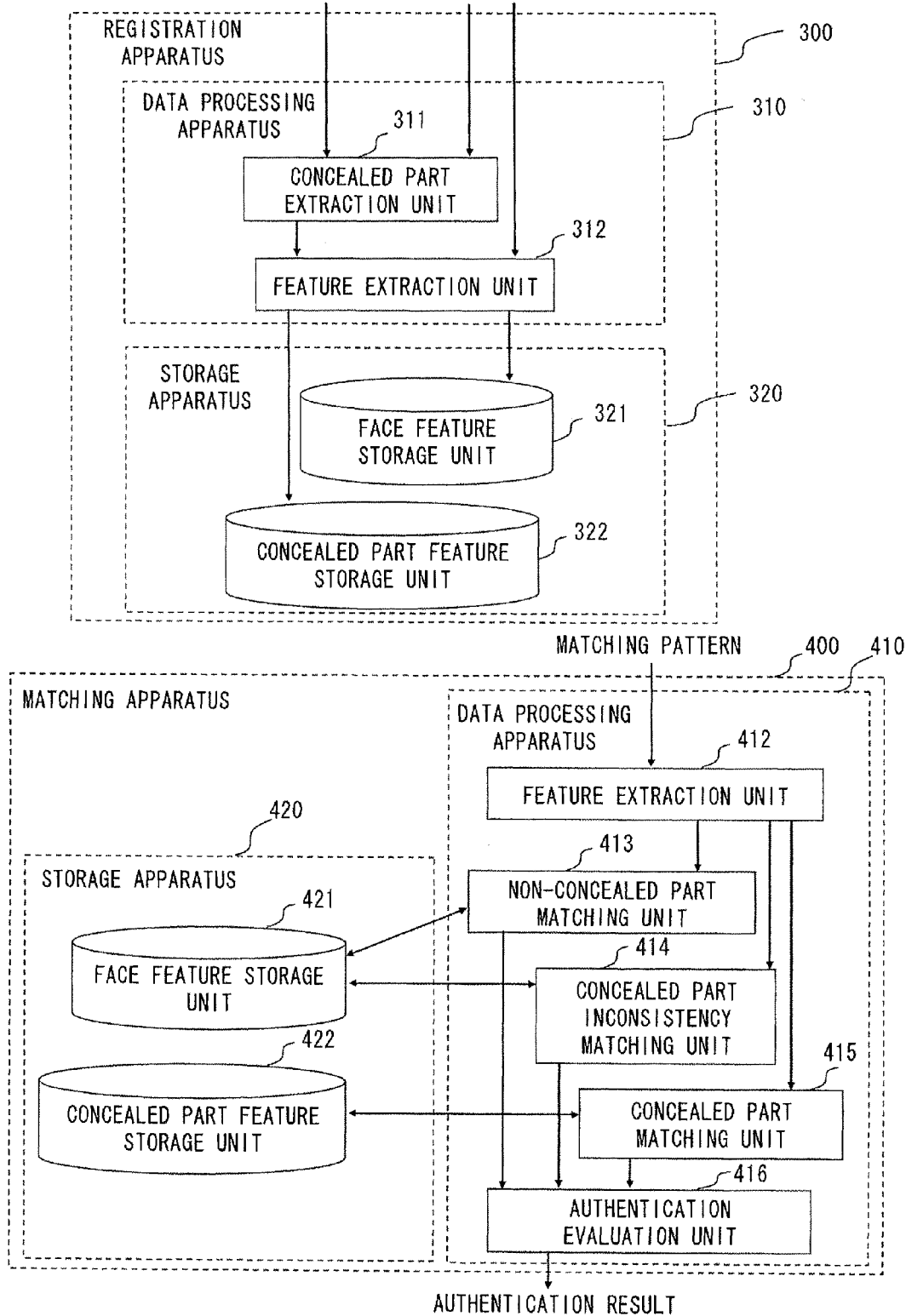
FIG. 5 is a block diagram showing a configuration of a personal authentication system according to a second exemplary embodiment of the present invention.

The concealed part extraction unit 11 compares the pattern including the concealment in the face with the pattern including no concealment in the face, and extracts the part where the face is concealed (see FIG. 5).

The feature extraction unit 12 extracts the feature used to match the patterns. When registering a person, the feature is extracted from each of the input registered pattern or the pattern of the concealed part, the feature of the face is stored to the face feature storage unit 21, and the feature of the concealed part is stored to the concealed object feature storage unit 22.

At the time of matching the person, the matching pattern is input to the feature extraction unit 12 that extracts the feature of the matching pattern. Such feature extraction process corresponds to the process of extracting a Fourier spectrum, for example, when the technique of PTL 1 is used.

The non-concealed part matching unit 13 evaluates the consistency between the registered pattern and the matching pattern for the part not concealed in the registered pattern.

The concealed part inconsistency matching unit 14 evaluates inconsistency between the non-concealing pattern at the time of registration and the matching pattern for the concealed part in the registered pattern.

The concealed part matching unit 15 evaluates the consistency between the concealing pattern at the time of registration and the matching pattern for the concealed part in the registered pattern.

Note that since the concealed part inconsistency matching unit 14 and the concealed part matching unit 15 are both processing units for examining the concealed part at the time of registration, one of the processing units may be omitted. However, with both of the processing units, a more accurate authentication result can be obtained.

Next, an entire operation of this exemplary embodiment is explained in detail with reference to the drawings. Firstly, a registration process is explained, and then a matching process is explained.

Figure 3:
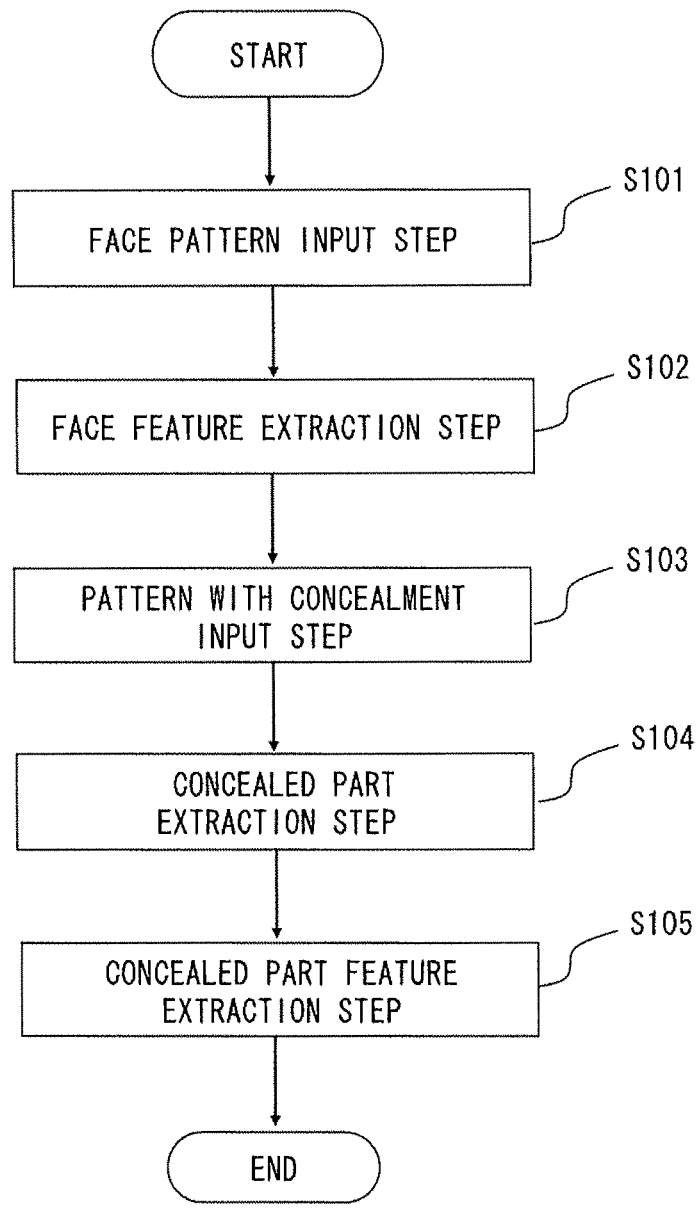
FIG. 3 is a flowchart showing a flow of a registration process by a data processing apparatus according to the first exemplary embodiment of the present invention.

FIG. 3 is a flowchart showing the flow of the registration process by the abovementioned data processing apparatus 10.

With reference to FIG. 3, firstly a face pattern with no concealment is input to the data processing apparatus 10 (step S101).

Next, the data processing apparatus 10 extracts feature for the input face pattern by the feature extraction unit 12 (step S102). The feature extracted at this step S102 is stored to the face feature storage unit 21.

Next, a face pattern with a concealment is input to the data processing apparatus 10 (step S103).

Next, the data processing apparatus 10 compares the input face pattern with the concealment and the face pattern input at the step S101, and extracts the concealed part (step S104).

Next, the data processing apparatus 10 extracts the feature by the feature extraction unit 12 for the concealed part extracted at the step S104 (step S105). The feature extracted at this step S105 is stored to the concealed object feature storage unit 22.

Figure 4:
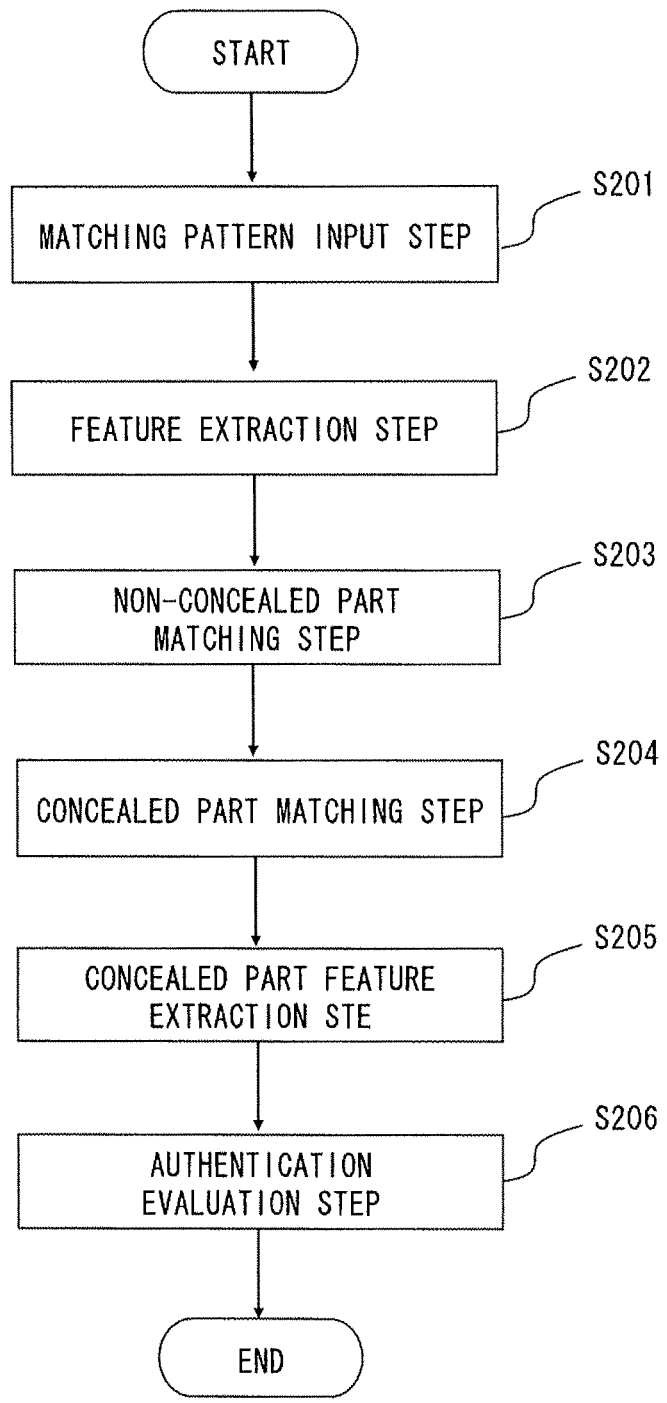
FIG. 4 is a flowchart showing a flow of a matching process by the data processing apparatus according to the first exemplary embodiment of the present invention.

FIG. 4 is a flowchart showing the flow of the matching process by the abovementioned data processing apparatus 10.

Referring to FIG. 4, firstly when a matching pattern is input (step S201), the data processing apparatus 10 extracts feature of the input matching pattern by the feature extraction unit 12 (step S202).

Next, the data processing apparatus 10 matches the extracted matching pattern (feature) and the registered pattern (feature) extracted at the step S102 of FIG. 3 for the non-concealed part (step S203). In this step S203, the matching process is performed, that evaluates the consistency between the registered pattern (feature), which corresponds to the part not the concealed part extracted at the step S104 of FIG. 3, that is, the part where no concealment exists in the face at the time of registration, and the matching pattern (feature).

Next, the data processing apparatus 10 compares the matching pattern (feature) extracted at the step S202 and the registered pattern (feature) extracted at the step S105 of FIG. 3 (step S204). In this step S204, the matching process is performed, which evaluates the consistency between the concealed part extracted at the step S104, that is, the pattern (feature) of the part where the concealment exists in the face at the time of registration, and the matching pattern (feature) for the concealed part.

Next, the data processing apparatus 10 compares the inconsistency of the matching pattern (feature) extracted at the step S202, and the registered pattern (feature) extracted at step S102 of FIG. 3 for the concealed part (step S205). In this step S205, the matching process is performed, which evaluates the inconsistency between the registered pattern (feature), which corresponds to the concealed part extracted at the step S104 of FIG. 3, that is, the part where the concealment exists in the face at the time of registration, and the matching pattern (feature).

Lastly, the data processing apparatus 10 evaluates whether or not the matching pattern is a pattern of the registered person based on each matching result of the step S203, step S204, and step S205 (step S206), and evaluates success or failure of the personal authentication. As for this evaluation, individual evaluation score may be summed, or more simply, a logic AND may be performed for each process result of the step S203, step S204, and step S205.

In the case of this exemplary embodiment, it can be considered that a user attempting to be authenticated cannot correctly reproduce the concealed part, and the concealed part may deviate between registration time and matching time. More desirably, instead of simply performing a match in the concealed part matching step of the step S204, by searching near where there is the concealment at the time of registration by template matching or the like using the registered pattern of the concealed part, it is possible to improve the authentication accuracy.

Moreover, in the example of FIG. 3, it is described that each step is processed in order for the clarity of the explanation in one flowchart, however as long as the feature of the entire face with no concealment and the feature of the part with a concealment is extracted, the order of the steps may be changed, the processes may be operated in parallel, or patterns may be input in several times. Further, in the case of only changing the registration data instead of newly registering one, it is not necessary to change the face pattern with no concealment, thus the steps S101 and S102 corresponding to the input of the face with no concealment and the feature extraction may be omitted.

Furthermore, in the example of FIG. 4, it is described that each step is processed in order for the clarity of the explanation in one flowchart, however as for the three steps of the step S203, step S204, and step S205, even when the order of the processes is switched, the same result can be obtained or the processes may be performed in parallel.

On the other hand, as for the feature extracted by the feature extraction unit 12, it may be any kind of feature as long as the feature extraction method at the time of registration and the feature extraction method at the time of matching are the same. As long as the feature extraction method at the time of registration and the feature extraction method at the time of matching are the same, the manner of the feature extraction of the face and the manner of the feature extraction of the concealed part may be different, for example.

Note that as mentioned above, since both processes of the steps S204 and S205 examine the concealed part at the time of registration, even when one of the steps is omitted, eventually an authentication result can be output. In this exemplary embodiment, by performing both steps, a more accurate authentication result is obtained.

In this exemplary embodiment, not only the concealed position but the concealed part itself is considered as the feature to perform authentication, however the concealment may be generated from any object. It may be a hand and a finger of the person, or may be an object such as an ornament and a card. Especially by using an apparatus or a light-source apparatus that can display a particular pattern as a conceal object, it is possible to easily prepare different concealed conditions, thus an authentication system that can easily change the registered pattern can be achieved.

Further, a change in a part of a face image from a face in a normal condition may be used for authentication instead of the "concealment". For example, a shadow may be made to a part over a facial surface of the face image by irradiating the face with light with any wavelength or a pattern, instead of a physical concealment to create the change in the part of the face. Further, creating the change in the part of the face can also be realized by changing the condition of an organ on the facial surface, thus for example, it can be an authentication system that holds a difference from a condition with both eyes of the face closed and a condition with a wide open mouth as additional information, and uses it for authentication.

As described above, in this exemplary embodiment, it is configured in a way that the feature of the entire face with no concealment and the feature of the concealed part is held, and the part with no concealment and the part with a concealment are respectively matched, thus it is possible to accurately compare the concealed condition at the time of registration and the concealed condition at the time of matching for an arbitrary concealment. Therefore, it is possible to easily change the registered pattern of the authentication system by changing the concealed condition at the time of registration.

Figure 7:
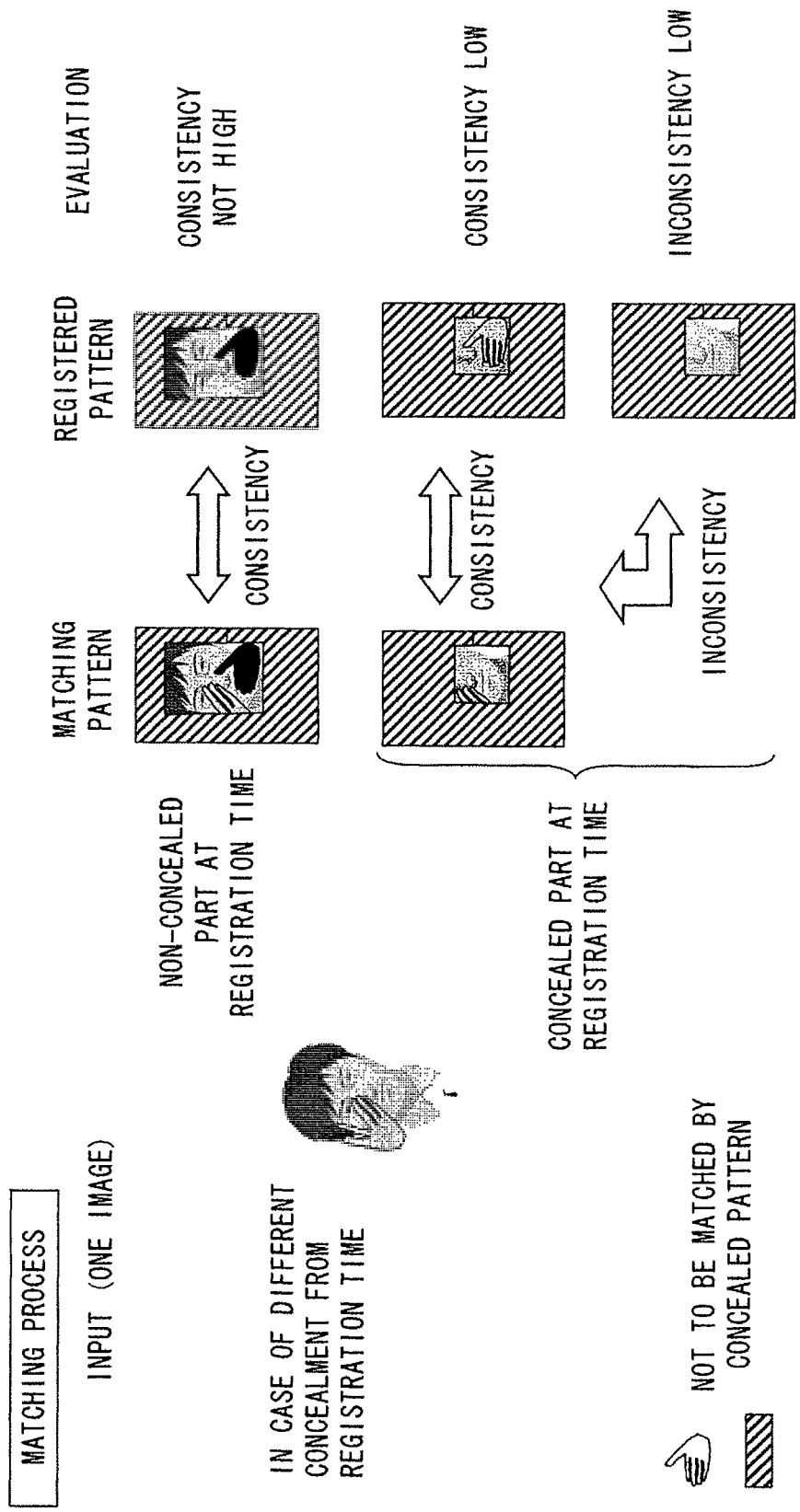
FIG. 7 is a view for explaining an example of the matching process by the data processing apparatus according to the first exemplary embodiment of the present invention.

Especially in this exemplary embodiment, since it is configured to evaluate also the inconsistency of the registered pattern with no concealment that corresponds to the concealed part at the time of registration and the matching pattern (feature), even when the position of the concealment deviates at the time of matching, it is possible to correctly evaluate the concealed part (the cases are the middle row and the lower row of FIG. 7).

Further, in this exemplary embodiment, as the data processing apparatus 10 operates only by inputting the registered pattern (image) and the matching pattern (image), it is not necessary to provide a plurality of input units as in PTL 3, and it is possible to perform highly accurate authentication using an image input from a general input data obtain processing unit such as a camera. Therefore, it is not necessary to increase the number of processing units for obtaining input data, and moreover, in the case that the input data obtain processing unit is a non-contact sensor such as a camera, an advantage thereof, which is a non-contact property, is not lost.

Furthermore, in this exemplary embodiment, since one person can use several different patterns as the registered pattern, the following effect can be obtained.

In the case that different patterns are registered for each authentication systems when a person uses several personal authentication systems according to the present invention, there is an advantage generated that even when the registered pattern of a certain system is forged, no influence is affected on authentication of other systems. Moreover, when the plurality of registered patterns and the plurality of systems using the personal authentication are associated one-by-one, there is an advantage generated that it is possible to automatically select one from the plurality of systems.

Second Exemplary Embodiment

Next, a second exemplary embodiment is described in detail with reference to the drawings, in which the data processing apparatus of the personal authentication system of the abovementioned first exemplary embodiment is separated into a registration apparatus and a matching apparatus.

FIG. 5 is a block diagram showing a configuration of a personal authentication system according to the second exemplary embodiment of the present invention. The personal recognition system of this exemplary embodiment is composed of a registration apparatus 300 that performs processes at the time of registration, and a matching apparatus 400 that performs processes at the time of matching.

The registration apparatus 300 is composed of a data processing apparatus 310 and a storage apparatus 320, the data processing apparatus 310 includes a concealed part extraction unit 311 and a feature extraction unit 312, and the storage apparatus 320 includes a face feature storage unit 321 and a concealed part feature storage unit 322.

The matching apparatus 400 is composed of a data processing apparatus 410 and a storage apparatus 420, the data processing apparatus 410 includes a feature extraction unit 412, a non-concealed part matching unit 413, a concealed part inconsistency matching unit 414, a concealed part matching unit 415, and an authentication evaluation unit 416, and the storage apparatus 420 includes a face feature storage unit 421 and a concealed part feature storage unit 422.

Each abovementioned processing unit performs the same operation as the processing unit with the same name in the first exemplary embodiment, and each storage unit holds the same kind of data as the storage unit with the same name in the first exemplary embodiment.

However, the feature extraction unit 12 of the first exemplary embodiment processes both of the registered pattern and the matching pattern whereas the feature extraction unit 312 of the second exemplary embodiment performs a feature extraction process of the registered pattern, and the feature extraction unit 412 of the second exemplary embodiment performs a feature extraction process of the matching pattern.

Further, although the registered pattern obtained by the operation of the registration apparatus 300 is held to the face feature storage unit 321 and the concealed part feature storage unit 322 of the storage apparatus 320, this data is the same as the data that should be held to the storage apparatus 420 of the matching apparatus 400.

Therefore, as for the storage apparatus 320 and the storage apparatus 420 of FIG. 5, when actually composing the system, they may be the same apparatus.

Next, an entire operation of this exemplary embodiment is explained in detail with reference to the drawings. In this exemplary embodiment in a similar manner as the first exemplary embodiment, there are two kinds of processes, which are the registration process and the matching process, and each of them is executed by the registration apparatus and the matching apparatus.

The registration process is the same as the registration process of the first exemplary embodiment shown in FIG. 3, and the matching process is the same as the matching process of the first exemplary embodiment shown in FIG. 3.

As described above, in the second exemplary embodiment of the present invention, in addition to the similar effect as the first exemplary embodiment, since the registration apparatus and the matching apparatus are composed as different apparatuses, a usage can be possible such that when performing only the registration, only the registration apparatus is used and when performing only the matching, only the authentication apparatus is used.

In the case of actually using the personal authentication system, since the registration process may be used only in the cases for example when the pattern is registered or modified, and on the other hand, the matching process is used in all the cases that require authentication, the number of registration apparatuses may be less than the number of the matching apparatuses. Accordingly, when the registration apparatus and the matching apparatus are separated, the number of the registration apparatuses can be reduced and thus the cost reduction effect can be achieved.

Example

Next, an operation of the personal authentication system of each abovementioned exemplary embodiment is explained in detail with reference to the pattern diagrams of FIGS. 6 to 8.

Note that in the following explanation, the personal authentication system with the configuration of the first exemplary embodiment shall be used, the data processing apparatus 10 shall be a personal computer, and the storage apparatus 20 shall be a semiconductor memory or a hard disk drive. The concealed part extraction unit 11, the feature extraction unit 12, the non-concealed part matching unit 13, the concealed part inconsistency matching unit 14, the concealed part matching unit 15, and the authentication evaluation unit 16 can be realized by computer programs that cause the personal computer to function as each of the abovementioned processing units.

Figure 6:
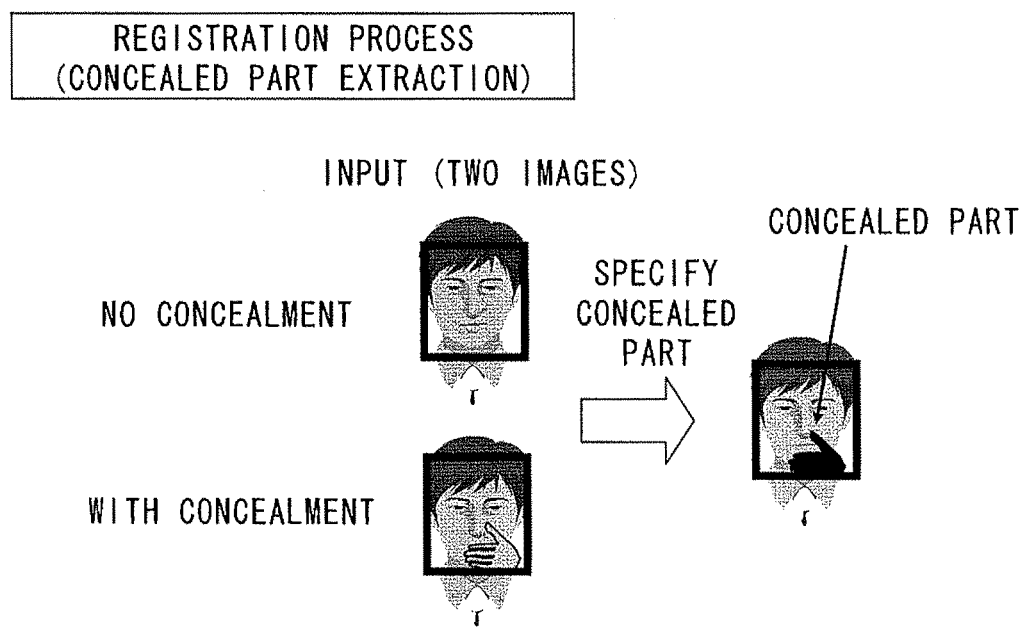
FIG. 6 is a view for explaining an example of the registration process by the data processing apparatus according to the first exemplary embodiment of the present invention.

First, with reference to FIG. 6, a specific operation of the registration process shown in FIG. 3 is explained. In the face pattern input step S101 explained in FIG. 3, an image of a face with no concealment is input as the registered pattern (corresponds to upper left of FIG. 6). At this time, when the face images are aligned according to the position of both eyes, for example, the accuracy of subsequent processes will be high.

In the face feature extraction step S102 explained in FIG. 3, the feature for matching the face image is calculated. As for the kind of the feature, the feature generally used in the field of pattern recognition of an image may be used. For example, a luminance value of the image may be used or data of extracted edges from the image may be the feature.

In the pattern with concealment input step S103 explained in FIG. 3, an image with a concealment in a face is input as the registered pattern (corresponds to lower left of FIG. 6). At this time, in a similar manner as the former face image with no concealment, when the face images are aligned, the accuracy of subsequent processes will be high.

In the concealed part extraction step S104 explained in FIG. 3, a difference between the image with the concealment in the face and the image with no concealment should be taken (corresponds to right of FIG. 6). For example, a difference of the luminance value is calculated by the unit of pixel, and a labeling process is performed to a region where the difference value is more than or equal to a certain value. The labeling process is a kind of image processing and is a process to attach a unique label to a group of pixels. As a result of performing the labeling process, when there is a partial region with a certain area or greater, the partial region is extracted as the concealed part. In order to simplify the process, as for the treatment of the concealed part, it may be processed as a concealed shape circumscribed rectangle.

In the concealed part feature extraction step S105 explained in FIG. 3, feature extraction is performed to the partial region evaluated to have a concealment. For example, the data of extracted edges can be the feature.

Note that as for the kind of the feature, there is no problem when the kind of the feature directly compared on the registration side and the matching side in the matching process steps S203, S204, and S205 which are explained in FIG. 4, thus it is not necessary that the feature extraction method (step S102) of the face image with no concealment and the feature extraction method (step S105) of the face image with a concealment are the same.

Figure 8:
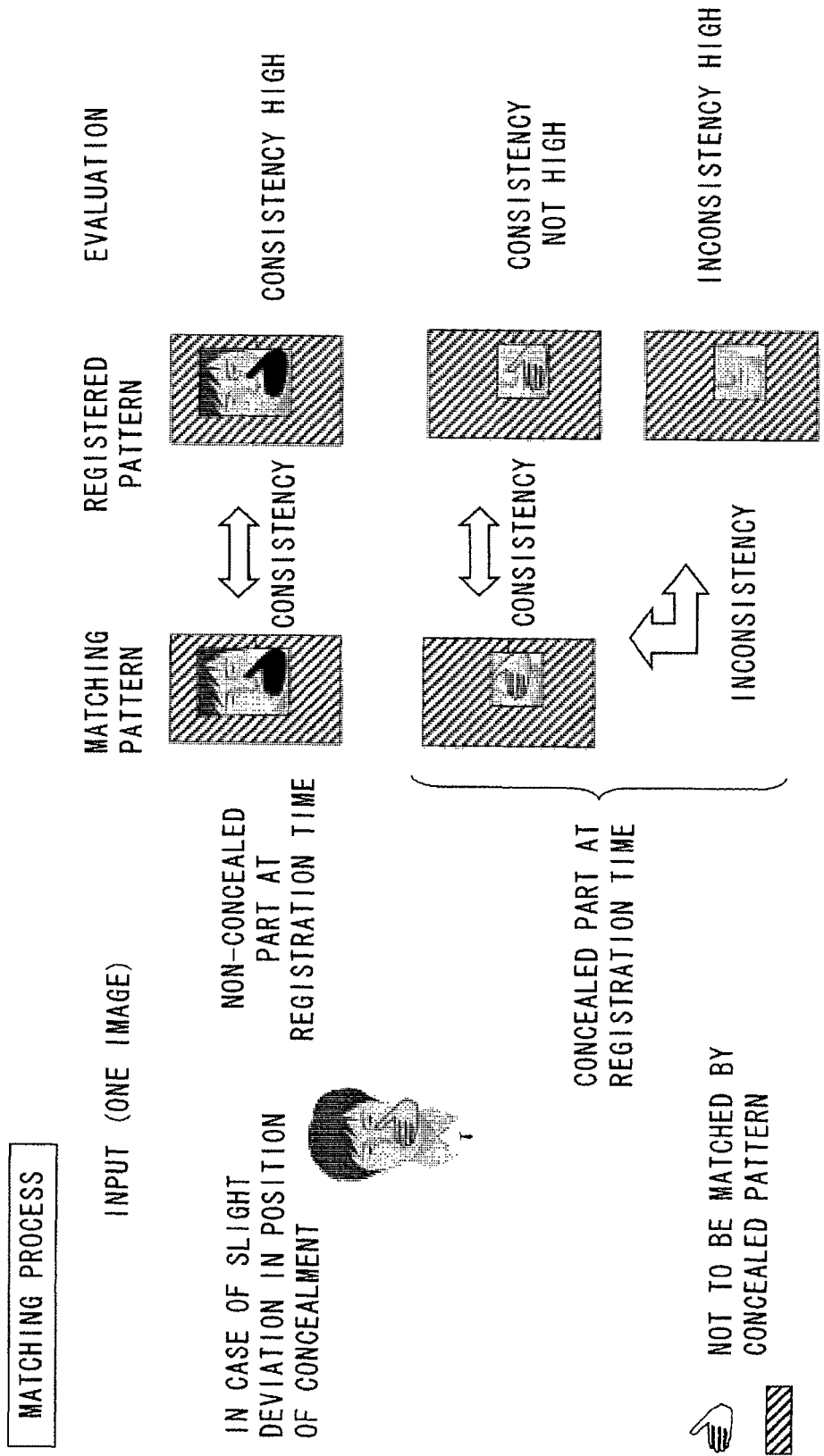
FIG. 8 is a view for explaining the example of the matching process by the data processing apparatus according to the first exemplary embodiment of the present invention.

Next, with reference to FIGS. 7 and 8, a specific operation of the matching process shown in FIG. 4 is explained. In the matching pattern input step S201 explained in FIG. 4, an image is input as a pattern to be matched. At this time, when the face images are aligned according to the position of both eyes, for example, the accuracy of the subsequent processes will be high.

In the feature extraction step S202 explained in FIG. 4, the feature for matching the face image is calculated. As described above, the feature calculated here is selected in a way that the kinds of the feature directly compared on the registration side and the matching side will be the same in the steps S203, S204, and S205 of the matching process. For example, when the feature of the registered pattern is unified to be the data of extracted edges from an image, the data may be the feature also on the matching side.

In the non-concealed part matching step S203 explained in FIG. 4, matching is performed whether the registered pattern (feature) and the matching pattern (feature) match for the part which is not evaluated as the concealed part at the time of registration (see the upper row of FIG. 7). That is, consistency is evaluated using only the part of extracted feature. As for this matching process, similarity can be obtained by calculating normalized correlation, for example, and this value may be the score of matching result (evaluation value of consistency).

Although the calculation is made for the data excluding the part corresponding to the place not concealed at the time of registration, as in PTL 2, in the case of matching by the method that can perform image matching even when an arbitrary concealment exists, it is possible to calculate the consistency between images including the part concealed at the time of registration.

In the concealed part matching step S204 explained in FIG. 4, matching is performed whether the registered pattern (feature) with a concealment and the matching pattern (feature) match for the part which is evaluated as the concealed part at the time of registration (see the middle row of FIG. 7). That is, consistency is evaluated using only the part of extracted feature. As for this matching process, similarity can be obtained by calculating normalized correlation, for example, and thus this value may be the score of matching result.

In the concealed part inconsistency matching step S205 explained in FIG. 4, matching is performed whether the registered pattern (feature) with no concealment and the matching pattern (feature) are inconsistent for the part which is evaluated to be the concealed part at the time of registration (see the lower row of FIG. 7). That is, inconsistency is evaluated using a part of extracted feature. As for the inconsistency matching process, similarity can be obtained by calculating normalized correlation, for example, and thus the value of the size of the similarity inverted may be the score of inconsistency result.

Note that as explained in the first exemplary embodiment, when the present invention is actually used by a person, it is expected that the concealed part deviates between the registration time and the matching time (refer to FIG. 8). In this case, as shown in FIG. 8, it is considered that the consistency of the registered pattern (feature) with a concealment and the matching pattern (feature) is evaluated to be low. In order to avoid such phenomenon, when the registered pattern with a concealment is used as a template to search near the concealed part at the time of registration by a template matching process, the matching accuracy of the concealed part matching step S204 can be increased, and thereby improving the authentication accuracy in actual use (see the middle row of FIG. 8).

In the authentication evaluation step S206 explained in FIG. 4, three matching results of the abovementioned steps S203, S204, and S205, are integrated, and it is evaluated whether the registered person and the person to be matched are the same person and the same concealment is generated. For example, threshold evaluation is performed to each of the scores obtained in the three matching steps, and in the case that all the results of each step are evaluated to be a successful match (there is an inconsistency in the step S205), it is considered to be successful authentication, otherwise it is considered to be failed authentication.

However, as shown in FIG. 8, when it is expected that the concealed part deviates between the registration time and the matching time, it can be configured in a way that the threshold of the matching score in the concealed part matching step S206 is reduced, more specifically, even when the consistency is not high enough, it may be evaluated that the same concealment is generated.

As mentioned above, although preferred exemplary embodiments of the present invention and the example thereof are explained, the present invention is not limited to the abovementioned exemplary embodiments and the example thereof, and further modification, replacement, and adjustment may be added without departing from the basic technical ideal of the present invention. For example, although the abovementioned exemplary embodiment explained that the face authentication is performed, in a similar manner for the system to perform personal authentication by other biological patterns such as a fingerprint, an iris, a vein pattern, it can be realized by receiving and holding a setting of additional information.

Moreover, for example, although the abovementioned exemplary embodiment explained that a concealment of a face and a change of expression are held as the additional information, when using other biological patterns such as a fingerprint, a vein pattern, etc., it is difficult to cover by a hand or change expression like the face image, however by putting a seal or the like that can cover a part of the pattern on a fingertip or a back of the hand, a concealment or a change can be set.

Alternatively, an additional information input processing unit may be provided on the registration apparatus side, which is realized by image processing software or the like and receives a position to conceal, a kind of conceal pattern, a position to be changed or an image effect to give a change. By providing an equivalent additional information input unit also on the authentication apparatus side, an authentication system can be obtained which is difficult to use forged data as with the abovementioned face authentication system.

In the abovementioned exemplary embodiments and examples, although the present invention is explained as the configuration of hardware, the present invention is not limited to this. The present invention can be also realized by causing a CPU (Central Processing Unit) to execute arbitrary processes, for example the procedure described in the flowchart of FIG. 3 or 4. In this case, a computer program can be stored to storage media to be provided, or can be provided by transmitting the computer program via other communication media such as the Internet. Further, the storage media include, for example, flexible disks, hard disks, magnetic disks, magneto-optical disks, CD-ROM, DVD, ROM cartridges, RAM memory cartridges with battery backup, flash memory cartridges, and non-volatile RAM cartridges. Furthermore, the communication media include wireless communication media such as telephone lines and wireless communication media or the like such as microwave links.

This application claims priority rights of and is based on Japanese Patent Application No. 2008-295957 filed on Nov. 19, 2008, the entire contents of which are hereby incorporated by reference.

INDUSTRIAL APPLICABILITY

The present invention can be used in the biometric authentication field that is used in an authentication system including an ATM (Automated Teller Machine) of a bank, for example. Additionally, availability is included in various systems which require authentication.

REFERENCE SIGNS LIST 10, 310, and 410 DATA PROCESSING APPARATUS
20, 320, and 420 STORAGE APPARATUS
300 REGISTRATION APPARATUS
400 MATCHING APPARATUS
11, 311 CONCEALED PART EXTRACTION UNIT
12, 312, and 412 FEATURE EXTRACTION UNIT
13, 413 NON-CONCEALED PART MATCHING UNIT
14, 414 CONCEALED PART INCONSISTENCY MATCHING UNIT
15, 415 CONCEALED PART MATCHING UNIT
16, 416 AUTHENTICATION EVALUATION UNIT
21, 321, and 421 FACE FEATURE STORAGE UNIT
22, 322, and 422 CONCEALED PART FEATURE STORAGE UNIT
S101 FACE PATTERN INPUT STEP
S102 FACE FEATURE EXTRACTION STEP
S103 PATTERN WITH CONCEALMENT INPUT STEP
S104 CONCEALED PART EXTRACTION STEP
S105 CONCEALED PART FEATURE EXTRACTION STEP
S201 MATCHING PATTERN INPUT STEP
S202 FEATURE EXTRACTION STEP
S203 NON-CONCEALED PART MATCHING STEP S204 CONCEALED PART MATCHING STEP
S205 CONCEALED PART INCONSISTENCY MATCHING STEP
S206 AUTHENTICATION EVALUATION STEP

The invention claimed is:

1. An authentication apparatus comprising:
an information holding unit that, with respect to a previously registered biological pattern for authentication, holds additional information concerning a change that can be reproduced by a user having the biological pattern for authentication; and
an evaluation unit that evaluates success or failure of authentication according to consistency between the biological pattern for authentication that is reproduced using the additional information and a pattern input at authentication time as an evaluation factor,
wherein the additional information comprises a concealed part specified by the user in the biological pattern for authentication.

2. The authentication apparatus according to claim 1, comprising:
a non-concealed part matching unit that evaluates consistency between a non-concealed part of the biological pattern for authentication and a part corresponding to the non-concealed part of the pattern input at the authentication time;
a concealed part matching unit that evaluates consistency between the concealed part of the biological pattern for authentication and the part corresponding to the non-concealed part of the pattern input at the authentication time; and
an authentication evaluation unit that evaluates success or failure of the authentication based on a result of the non-concealed part matching unit and the concealed part matching unit.

3. The authentication apparatus according to claim 2, wherein the concealed part matching unit searches in the pattern input at the authentication time for a point that is similar to a pattern of the concealed part of the biological pattern for authentication at the registration time, and evaluates consistency between the pattern of the concealed part of the biological pattern for authentication at the registration time and the searched point.

4. The authentication apparatus according to claim 1, comprising:
a non-concealed part matching unit that evaluates consistency between a non-concealed part of the biological pattern for authentication and a part corresponding to the non-concealed part of the pattern input at the authentication time;
a concealed part inconsistency matching unit that evaluates inconsistency between a pattern in which the concealed part of the biological pattern for authentication is not concealed and the pattern input at the authentication time; and
an authentication evaluation unit that evaluates success or failure of the authentication based on a result of the non-concealed part matching unit and the concealed part matching unit.

5. The authentication apparatus according to claim 1, further comprising a feature extraction unit that extracts a feature of the input pattern, wherein the authentication apparatus evaluates the consistency based on the feature.

6. The authentication apparatus according to claim 1, further comprising:
a difference extraction unit that extracts information from two or more biological patterns for authentication that are input,
wherein the additional information comprises the information extracted by the difference extraction unit.

7. A non-transitory computer-readable storage medium that stores a program for causing a computer to execute a process, the computer composing a registration apparatus that provides a biological pattern for authentication at registration time and information concerning a change that can be reproduced by the use with respect to the biological pattern for authentication to the authentication apparatus according to claim 1, and the process comprising:
a process to input a biological pattern for authentication from a predetermined input apparatus; and
with respect to the biological pattern for authentication, a process to receive an input of information concerning a change reproduced by a user.

8. A registration apparatus comprising:
a processing unit to input a biological pattern for authentication; and
a processing unit to receive from a user information concerning a change that can be reproduced by the user with respect to the biological pattern for authentication, wherein the registration apparatus provides the biological pattern for authentication at registration time and the information concerning the change that can be reproduced by the user to the authentication apparatus according to claim 1.

9. The registration apparatus according to claim 8, further comprising:
a difference extraction unit that compares two biological patterns for authentication being input, and extracts information based on this comparison,
wherein the additional information comprises the information extracted by the difference extraction unit.

10. The registration apparatus according to claim 8, further comprising a feature extraction unit that extracts a feature of the input pattern,
wherein the registration apparatus converts the biological pattern for authentication at the registration time and the information concerning a concealed part into the feature, and provides the feature to the authentication apparatus.

11. The registration apparatus according to claim 8, wherein a change requirement of the additional information is relaxed with respect to a change requirement of the biological pattern for authentication.

12. An authentication system comprising:
the authentication apparatus according to claims 1; and
the registration apparatus according to claim 8.

13. An authentication system comprising:
the registration apparatus according to claim 8.

14. An authentication method comprising:
with respect to a previously registered biological pattern for authentication, holding in a storage apparatus additional information concerning a change that can be reproduced by a user having the biological pattern for authentication;
evaluating success or failure of authentication using a processor of a data processing apparatus according to consistency between the biological pattern for authentication reproduced using the additional information and a pattern input at authentication time as an evaluation factor, the additional information comprises a concealed part specified by the user in the biological pattern for authentication.

15. The authentication method according to claim 14, further comprising:
    evaluating consistency between a non-concealed part of the biological pattern at the registration time and a part corresponding to the non-concealed part of the pattern input at the authentication time;
    evaluating consistency between the concealed part of the biological pattern for authentication at the registration time and a part corresponding to the concealed part of the pattern input at the authentication time; and
    evaluating success or failure of the authentication based on a result of the evaluation of consistency of the non-concealed part and the evaluation of consistency of the concealed part.

16. The authentication method according to claim 14, further comprising:
    evaluating consistency between a non-concealed part of the biological pattern at the registration time and a part corresponding to the non-concealed part of the pattern input at the authentication time;
    evaluating inconsistency between a pattern in which the concealed part of the biological pattern for authentication at the registration time is not concealed and the part corresponding to the concealed part of the pattern input at the authentication time; and
    evaluating success or failure of the authentication based on a result of the evaluation of consistency of the non-concealed part and the evaluation of inconsistency of the concealed part.

17. A non-transitory computer-readable storage medium that stores a program for causing a computer to execute:
    with respect to a previously registered biological pattern for authentication, a process to receive an input of additional information concerning a change that can be reproduced by a user having the biological pattern for authentication;
    a process to evaluate success or failure of authentication according to consistency between the biological pattern for authentication reproduced using the additional information and a pattern input at authentication time as an evaluation factor,
    wherein the additional information comprises a concealed part specified by the user in the biological pattern for authentication.

* * * * *